Sept. 9, 1952 — H. J. GRAHAM — 2,610,278
PNEUMATIC WELDING GUN AND ASSOCIATED SYSTEM
Filed March 12, 1949 — 3 Sheets-Sheet 1
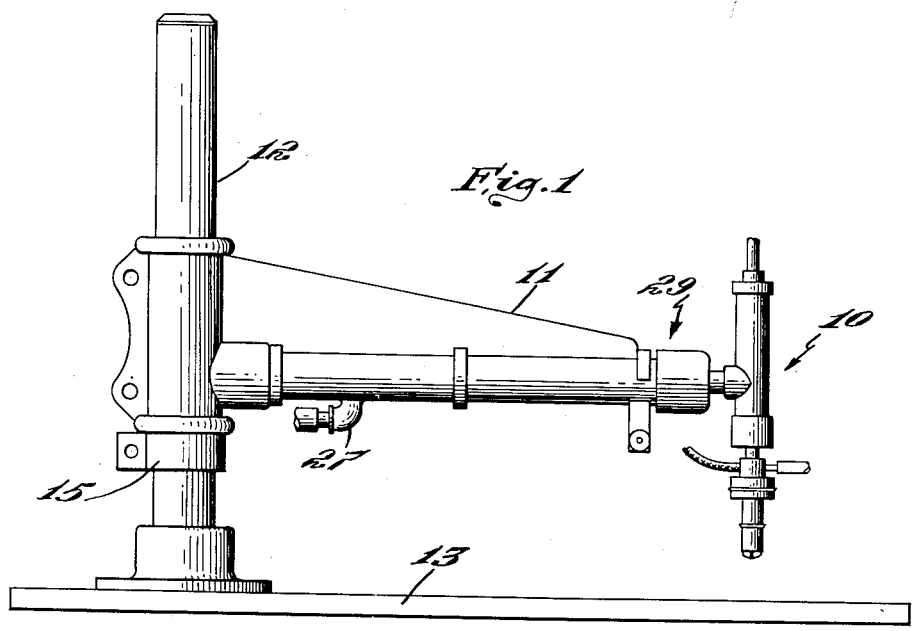
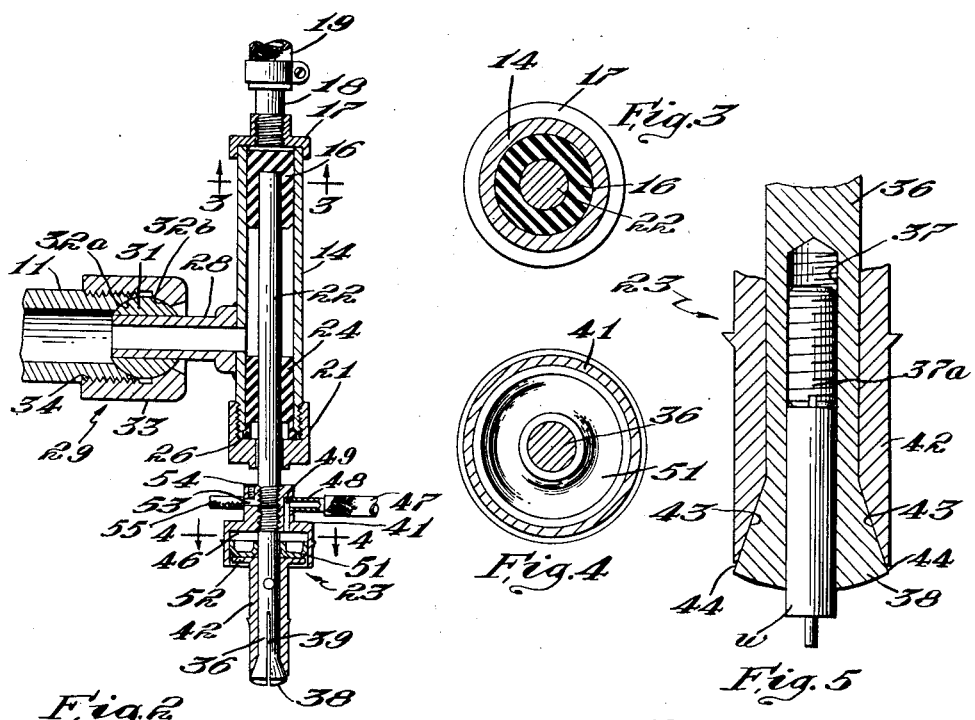
Inventor
Harold J. Graham
by Roberts, Cushman & Grover
Att'ys.

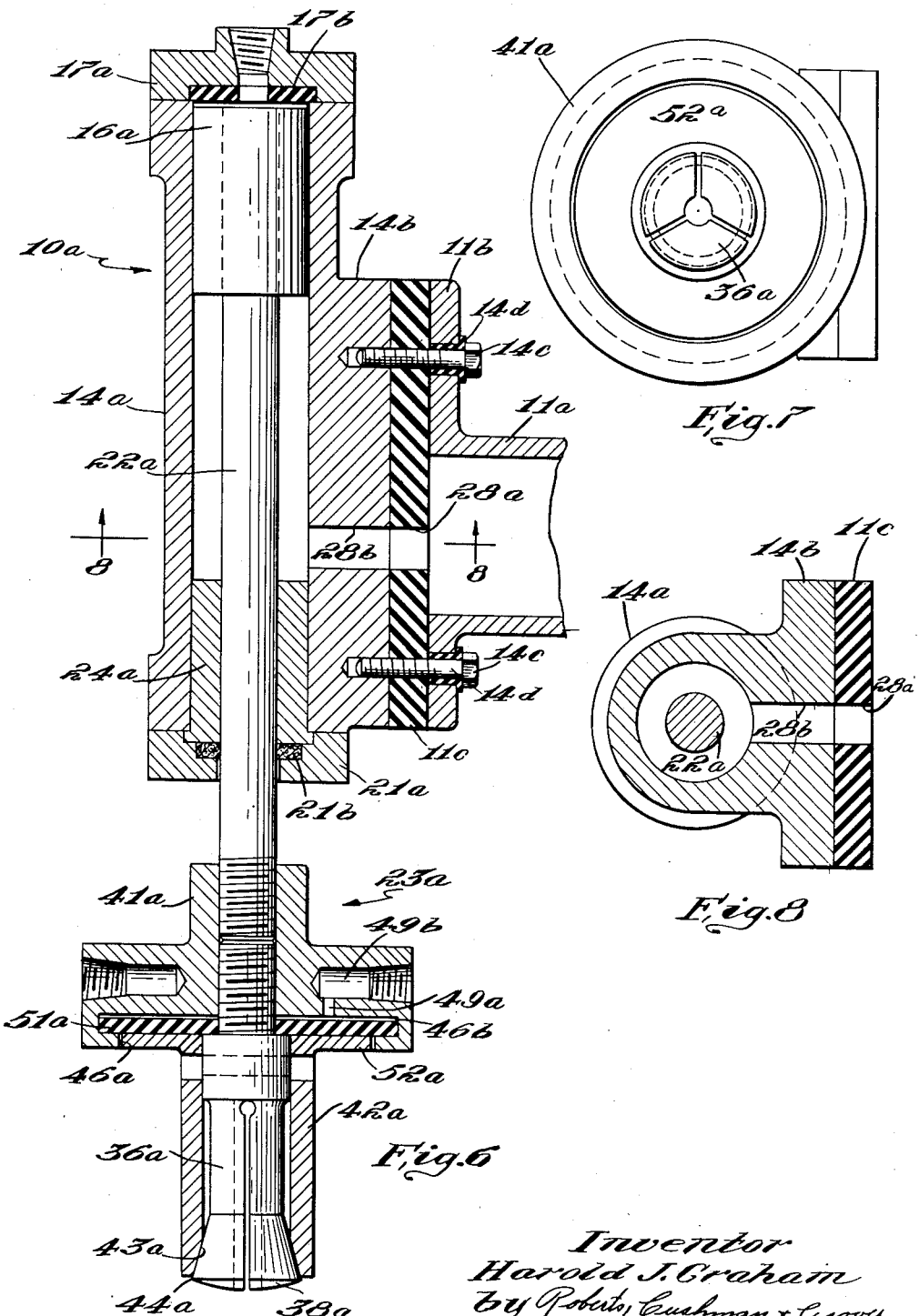

Patented Sept. 9, 1952

2,610,278

UNITED STATES PATENT OFFICE 2,610,278

PNEUMATIC WELDING GUN AND ASSOCIATED SYSTEM

Harold J. Graham, Highland Park, Mich., assignor to Graham Manufacturing Corporation, Detroit, Mich., a corporation of Michigan Application March 12, 1949, Serial No. 81,130

10 Claims. (Cl. 219—4)

This invention relates to welding apparatus and more particularly to percussion welding apparatus adapted to weld studs, preferably but not exclusively of the type shown in my copending application Serial No. 43,498, now U. S. Patent 2,518,463 granted August 15, 1930, to a workpiece.

Objects of this invention are to provide a welding tool and an associated electropneumatic system which will weld a stud to a workpiece, which produce a strong and flaw free union between the stud and the piece, which inherently regulate the welding current, which are rapid in operation, which do not require a highly skilled operator, which are simple and safe to use, which are adapted to mass production welding technique, and which advance the art of welding generally.

In a broad aspect the invention contemplates a welding system comprising a pneumatically operated welding tool having a piston reciprocatingly disposed in a cylinder connected to a compressed air supply. A stud to be welded is held in a chuck carried by the piston. Means, such as a valve and its associated piping, are provided to admit air to the cylinder from the connected operating air supply to move the piston until the stud contacts a workpiece thereby to maintain a welding circuit to supply energy to the point of contact and to maintain the stud in contact with the workpiece until the weld is completed. The welding circuit also includes a power source, for example, one or more capacitors which are connected in parallel between the tool and the workpiece. The piston is returned and the power source concomitantly disconnected by restoring means which is preferably pneumatically operated, for example, by the introduction of restoring air into the cylinder upon the opposite side of the piston from that to which the operating air is introduced. It is also feasible to use a spring or electromagnet to supply a biasing force for the piston.

In a specific aspect the invention contemplates a welding system for welding a stud to a workpiece which is held upon a worktable by a pneumatically operated clamp or other holding device. The term welding is intended to include pressure welding. As the herein described embodiment is designed to carry out percussion welding as a preferred embodiment, the more limited term will be used hereinafter, although it is to be expressly understood that the present invention is not limited to percussively operative apparatus. This system comprises a pneumatically operated welding gun including a cylinder having a piston reciprocatingly disposed therein. One end of the cylinder is directly connected to a compressed air supply so that the piston is continuously subjected to a restoring force. The stud to be welded is held in a pneumatically operated chuck which is carried by the piston. A foot operated control valve supplies compressed air from the air supply to both the clamps and the chuck securing the workpiece and studs respectively. Operating air is directly supplied to the opposite end of the gun piston through an electrically operated supply valve, the end of the piston in contact with the operating air having a greater effective area than the opposite piston end in contact with the restoring air so that the resulting unbalanced force moves the piston until the stud contacts the workpiece. One terminal of one or more capacitors is connected to the gun chuck, the other terminal being connected to a workpiece by a pneumatically operated switch. The capacitors are charged by connecting the terminals thereof to the power source by means of the contacts of an electric relay thereby to complete a charging circuit. The foot valve also supplies air to a solenoid operated control valve and to a pneumatically operated interlock having normally open contacts which close when the pressure exceeds that required to operate the clamps thereby to connect the solenoid operating the control valve in series with the power source and the normally open contacts of two safety switches. The resulting movement of the control valve supplies air to the pneumatically operated switch connecting the capacitor to the workpiece, and also pressurizes two pneumatically operated relays. The respective normally closed contacts of the pneumatic relays are connected in series with the power source, the solenoid of the charging circuit relay and the normally open contacts of the respective hand switches. The first pneumatic relay operates at a pressure less than that required to operate the pneumatic switch so that the welding circuit is interrupted before the charging circuit is completed. The second relay closes its normally open contact at a pressure greater than that required to operate the pneumatic switch to connect the electrically operated supply valve to the power source, thereby insuring that the pneumatic switch is closed before the gun is operated.

In another aspect the invention contemplates a welding tool comprising a cylinder having a piston reciprocatingly disposed therein and carrying a chuck adapted to hold a stud. The gun is adapted to be connected to one terminal of a power source, the other terminal of which source is connected to the workpiece. Means are provided for permitting air to the cylinder to move the piston until the stud contacts the workpiece to maintain a welding circuit supplying energy to the point of contact and to maintain the stud in forceable contact with the workpiece until the welding is complete. Restoring means return the piston and concomitantly disconnect the power source circuit after the completion of the weld.

In a more specific aspect the piston is of insulating material. One end of the cylinder is connected to a restoring air supply so that the piston is continuously subjected to a restoring force. The piston is fastened to one end of a rod the other end of which carries the chuck holding the stud. The rod is guided by a sleeve of insulating material which is interposed between the rod and the gun cylinder. The chuck is connected to one terminal of the power supply, the remainder of the gun being insulated from the rod by the piston and sleeve.

In another specific aspect the sleeve and piston are of metal, the gun being insulated from its supporting frame interposing a nonconducting gasket between the gun cylinder and the frame.

Another feature of the invention is the pneumatically operated chuck comprising a body including a plurality of jaws at one end thereof, the inner surfaces of which define a centrically disposed recess for holding the welding stud or other small piece. The other end of the body is fastened to a head which is secured to the end of the piston rod or other supporting structure. A collet is positioned circumjacent the body with a tapered inner surface which corresponds to tapered outer surfaces upon the jaws. Pneumatically operated means are located in the head for axially moving the collet with respect to the body whereby the diameter of the recess is reduced so that the stud is secured therein. The pneumatic means may be a sealing member for example either a cup or washer of flexible material located in a circular recess in such head so that air may be introduced into the recess behind the member by means of passageways located in the head. The member bears against a flange projecting normally from the collet thus moving the collet axially with respect to the body to reduce the diameter of the body recess, thus securing the stud or other piece.

These and other objects, aspects and features will be apparent from the following description of an illustrative specific embodiment of the invention referring to drawings in which:

Fig. 1 is a side elevation view of a welding tool according to the invention and its supporting frame;

Fig. 2 is a longitudinal cross-section of one embodiment of the welding head shown in Fig. 1;

Fig. 3 is a cross-sectional view on line 3—3 of Fig. 2;

Fig. 4 is a cross-sectional view on line 4—4 of Fig. 2;

Fig. 5 is an enlarged cross-sectional view of one embodiment of the chuck such as shown in Fig. 2;

Fig. 6 is a cross-sectional view of another embodiment of the welding gun;

Fig. 7 is a bottom view of the embodiment of the welding gun shown in Fig. 6;

Fig. 8 is a cross-sectional view on line 8—8 of Fig. 6; and

Figure 9:
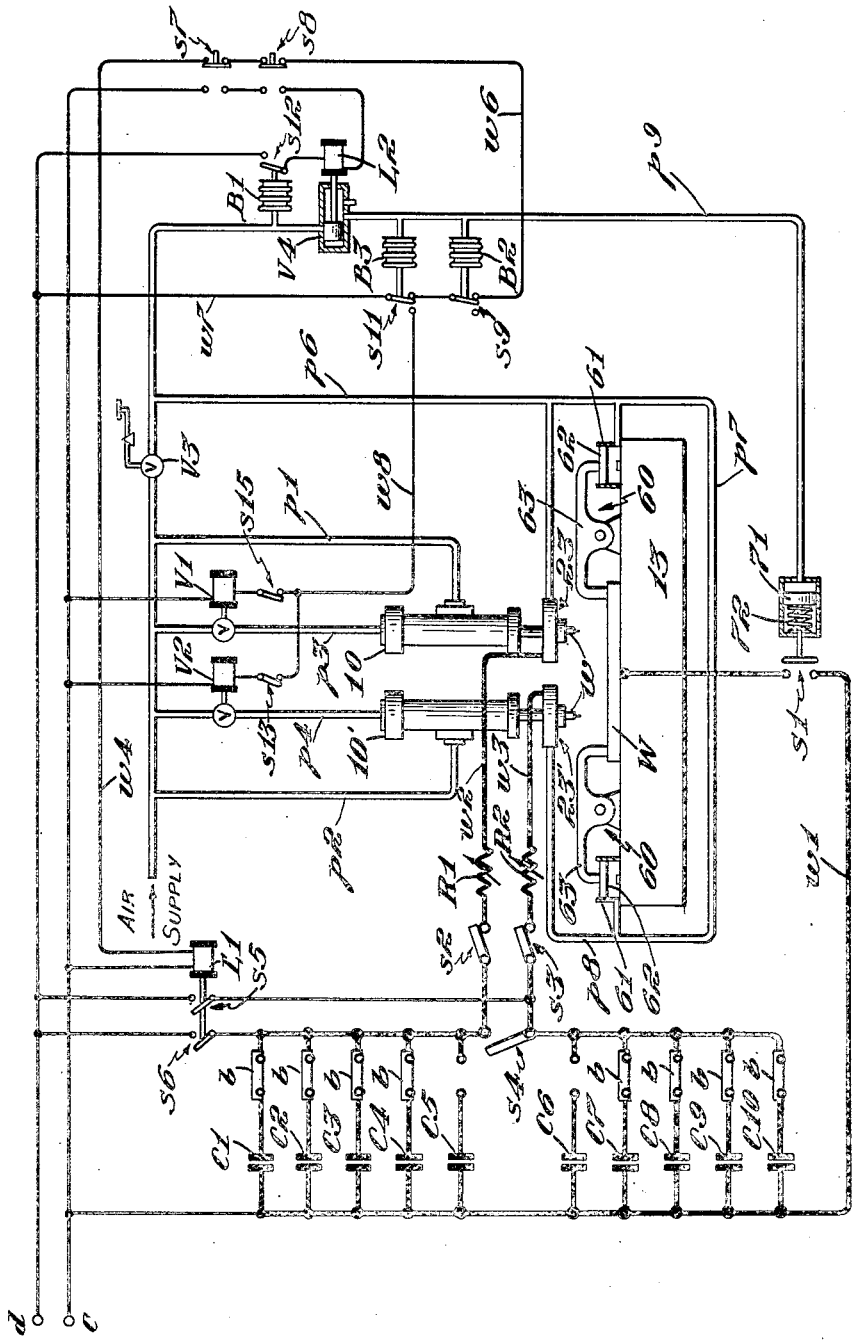
Fig. 9 is a diagrammatical view of the electrical and pneumatic connections of the system for two welding guns.

In the embodiment chosen for the purpose of illustration a welding gun 10 (Fig. 1) is carried at one end of a cantilever arm 11. The other end of the arm 11 is rotatably supported upon a vertical post or column 12 which is fastened to a table 13 adapted to hold a workpiece such as W (Fig. 9). The arm 11 is held at the desired elevation above the table 13 by an adjustable clamp band 15.

The gun 10 comprises a hollow body or cylinder 14 (Fig. 2) having a piston 16 of plastic or other electrically nonconducting material reciprocatingly disposed therein. The upper end of the cylinder 14 is closed by a cylinder head or cap 17 having a threaded aperture centrically located therein to engage the mating threads of a pipe nipple 18 which is connected to a conventional supply of compressed air (not shown) by means of a flexible hose 19.

The opposite end of the cylinder 14 is closed by a cap 21 having internal threads for engaging threads cut on the external surface of the cylinder. An aperture is centrically located in the cap 21 to accommodate a piston rod 22, one end of which is molded into or otherwise fastened to the piston 16. The other end of the rod 22 is threaded to engage a chuck 23 whose construction and operation are described in detail hereinafter. The piston 16 guides the correlated end of the rod 22. The end of the rod carrying the chuck 23 is guided in an aperture in a sleeve or bushing 24 which is pressed into the end of the cylinder 14. The bushing 24 is further secured by a lip 26 at one end thereof which is pinched between the cap 21 and the end of the cylinder 14 by engagement of their threads. The bushing 24 is preferably of plastic or other electrically nonconducting material and clearance is provided between the cap 21 and the rod 22 so that the welding current supplied to the chuck 23 (as will be described below) is prevented from flowing into the body 14 and the arm 11.

In the preferred embodiment the piston 16 is pneumatically biased in the upward position shown in Fig. 2 by introducing restoring air under pressure beneath the piston. The use of compressed air is preferred because of the linear characteristics of the resulting restoring force, but it is also possible by proper portioning of the elements to obtain the restoring force by means of a spring or an electromagnet. In the embodiment illustrated the restoring air is introduced through the arm 11, entering the arm through the elbow 27 (Fig. 1) and leaving through the conduit 28 (Fig. 2) having a flange at one end thereof welded or otherwise fastened to the side of the body 14 immediately above the sleeve 24 so that the aperture in the conduit is aligned with a corresponding aperture in the side of the body. The opposite end of the conduit 28 is preferably coupled to the end of the arm 11 by means of a ball and socket joint 29 so that the angle of the gun 10 can be adjusted with respect to the table 13.

The joint 29 comprises a ball 31 having an aperture therein which engages the conduit 28. The outer surface of the ball 31 is rotatable in a seat formed by the spherical surface 32a in the end of the arm 11 and a similar surface 32b in the end portion of a cap 33 which is fastened to the end of the arm 11 by the threaded connection 34.

The pneumatically operated chuck 23 (Fig. 5) comprises a cylindrical body 36 having a centrically disposed recess 37 in one end thereof defined by the inner surfaces of the three jaws 38 which are formed by three equally spaced axial slots 39 in the lower end of the body 36. The other end of the recess 37 is threaded to engage the threads upon a stop 37a against the bottom of which abuts the stud w. The upper end of the body 36 is threaded to engage threads in the lower portion of an aperture in a head 41. The threaded aperture extends through the head 41, the upper portion thereof engaging the threads upon the end of the piston rod 22 to couple the chuck 23 to the piston 16 as described heretofore.

A collet 42 is positioned circumjacent the cylindrical body 36. The lower end of the collet 42 has a tapered inner surface 43 corresponding to the taper on the outer surfaces 44 of respective chuck jaws 38 so that the jaws are compressed to reduce the diameter of the aperture 37 as the collet is axially moved relative to the body 36.

Such relative movement is produced pneumatically by introducing compressed air into a cylindrical recess 46 in the lower portion of the head 41. The air is supplied through a flexible hose 47 and a nipple 48 which is welded or otherwise fastened to the upper portion of the head 41 so that the aperture in the nipple connects with a passageway 49 extending through the head to communicate with the recess 46. Located in the recess 46 is a sealing member such as the annular cup 51 which is of flexible material for example rubber or leather. The cup 51 is of such proportions that the inner lip thereof is in contact with the bdoy 36 and its outer lip contacts the wall of the recess 46. The bottom of the cup 51 rests upon a circular flange 52 projecting normally from the upper portion of the collet 42 so that as air is introduced into the recess 46, as described above, the cup 51 bears against the flange 52 thereby moving the collet 42 to compress the jaws 38. The air pressure also forces the inner and outer lips of the cup 51 against the body 36 and the recess wall, respectively, thereby preventing the loss of air. The compression of the jaws 38 reduces the diameter of the aperture 37 to secure the welding stud w in the chuck, as shown in Fig. 5. When the air pressure is removed, the elasticity of the chuck jaws 38 forces the collet to move back so that the recess 37 returns to its original diameter.

Although the chuck 23 has been described for use with a welding gun, it is evident that a chuck of similar design and operation can also be used to hold small pieces in a lathe or other machine tool. When the chuck is used to hold a welding stud, the welding current is introduced by securing one lead 55 from a terminal of an electrical welding power source in a recess 53 in the side of the member 41 by means of a set screw 54. The other power source terminal is connected to the workpiece W so that a welding circuit is maintained when the stud w is in contact with the workpiece W, as will be described in detail hereinafter Air under pressure is maintained beneath the piston 16 at all times during the operating cycle of the gun 10, being supplied through the arm 11 and introduced into the cylinder 14 through the conduit 28, as described above. The stud w is inserted in the chuck recess 37 and the jaws 38 compressed by the axial movement of the collet 42 by the introduction of air into the head 41 through the flexible hose 47. The weld is made by introducing air above the piston 16 by means of the flexible hose 19 at sufficient pressure so that the piston descends carrying the chuck 23 and the stud w towards the workpiece W thereby completing and maintaining a welding circuit until the weld is complete. It is evident that such operation will take place with operating air introduced at the top of the piston 16 at the same or greater pressure as the restoring air beneath the piston because of the unbalanced force resulting from the reduction in effective area of the bottom of the piston by the rod 22. After the completion of the weld, the air supplied to the chuck 23 and to the top of the piston 16 is cut off so that the restoring air under the piston returns the piston concomitantly releasing the stud w.

A second embodiment of a welding gun 10a is shown in Figs. 6, 7 and 8. The gun 10a is generally similar in construction to the gun 10 (Fig. 2) comprising a cylinder 14a with a reciprocating piston 16a therein which is moved by operating air introduced through a cap 17a. The piston 16a and a guiding sleeve 24a for a piston rod 22a are of metal rather than of insulating material as is the case in the gun 10; the insulation from the supporting arm 11a being provided by an insulating gasket 11c which is inserted between a flange 11b on the end of the arm 11a and a boss 14b formed integrally with the side of the body 14a. The connection between the gun 10a and the arm 11a is by means of the bolts 14c which engage threads tapped in the boss 14b. Electrical contact between the bolts 14c and the flange 11b is prevented by the collars 14d which are of nonconducting material.

Restoring air for the piston 16a is introduced from the aperture in the arm 11a through the aligned apertures 28a and 28b in the gasket 11c and the boss 14b respectively. The loss of such air is prevented by the sliding fit between the piston rod 22a and the sleeve 24a. Lubrication for the rod 22a is provided by a felt wiper 21b between the sleeve 24a and a cap 21a fastened to the bottom of the cylinder 14a. A rubber washer 17b is recessed at the end of the cylinder 14a in the cap 17a thereby to act as a shock absorber for the piston 16a.

The upper end of the rod 22a is threaded or otherwise coupled to the piston 16a. The threads at the lower end of the rod 22a engage the upper portion of a threaded aperture in a head 41a of a chuck 23a. The lower portion of the threaded aperture engages the threaded end of a body 36a having three jaws 38a which are generally similar in construction to the jaws 38 described above. Surrounding the body 36a is a collet 42a having a tapered inner surface 43a at one end thereof for engaging with the corresponding outer surfaces 44a of the chuck jaws 38a.

The opposite end of the collet 42a has a normally projecting flange 52a of such diameter as to fit freely in a circular recess 46a in the bottom of the head 41a. The bottom portion of the recess 46a is bored as at 46b to a greater diameter than the remainder thereof to accommodate a flexible washer or diaphragm 51a having a centrically located aperture which engages the collet body 36a. Air is prevented from escaping by the bearing of the diaphragm 51a against the adjacent portion of the flange 52a.

The chuck 23a is operated by introducing air behind the washer 51a through the passageways 49a and 49b in the head 41a. The resulting force is transferred by the washer 51a to the flange 52a causing relative motion between the body 36a and the collet 42a thereby to contact the jaws 38a in a manner analogous to that described above in detail in connection with the operation of the chuck 23.

In Fig. 9 are shown the typical electric and pneumatic connections of two welding guns 10 and 10' for simultaneously welding two studs $w$ to the workpiece W secured by the pneumatically operated clamps 60 to a metal table 13. Electrical energy for the welding process is supplied from a power source preferably a bank of capacitors C1—C10. One terminal of each of the capacitors C1—C10 is connected to the work supporting table 13 by means of a heavy conducting cable $w1$ and the normally open contacts of an electrical interlock such as the pneumatically operated switch $s1$. The other terminals of the capacitors C1—C5 respectively are connected to the chuck of the welding gun 10 by means of a cable $w2$, a variable resistor R1, a strap $s2$ and the conducting straps $b$. By varying the number of straps $b$ inserted to link the capacitors C1—C5 to the gun 10, it is possible to connect the number of capacitors required to supply a capacitor discharge current suitable for the size and type of material of the studs $w$ and the workpiece W. In a similar manner the capacitors C6—C10 are selectively connected to the gun 10' by means of a conductor $w3$, a variable resistor R2, a strap $s3$ and the correlated straps $b$. It is also possible by closing a switch $s4$ to couple all the capacitors C1—C10 in parallel and connect the combination to a single gun by opening the strap $s3$ or $s2$ to disconnect the gun not to be used.

The capacitors C1—C10 are charged from the terminals $d$ and $c$ of a conventional direct power source (not shown) upon the closing of the normally open contacts $s5$ and $s6$ by the energization of a solenoid L1. During the time intervals between successive operating cycles, the solenoid L1 is energized from the terminals $d$ and $c$ by a circuit including a conductor $w4$, the normally closed contacts of the safety switches $s7$ and $s8$, a conductor $w6$ and the normally closed contacts $s9$ and $s11$ of two pneumatically operated relays whose function will be described in detail hereinafter. The switches $s7$ and $s8$ are safety interlocks so positioned that it is necessary for the operator to use the palms of both hands simultaneously to close both switches thereby insuring that neither hand is in contact with the welding gun while welding is taking place.

Restoring air for the welding guns 10 and 10' is supplied through the conduits $p1$ and $p2$ respectively from a conventional compressed air supply (not shown). The operating air for the welding gun 10 is supplied through a conduit $p3$ and an electrically operated supply valve such as the solenoid operated valve V1 from the same air supply although it will be understood that separate air supplies may be used. A similar supply valve V2 and a conduit $p4$ supply operating air for the gun 10'. The air for the chucks 23 and 23' and the pneumatically operated clamps 60 for holding the workpiece W securely to the table 13 is supplied from the air supply through the conduits $p6$, $p7$ and $p8$ and a manually operated valve V3 which preferably is opened by use of the operator's foot.

Air controlled by the valve V3 also extends a bellows B1 of a pneumatically operated relay with a contact $s12$ which is closed by the bellows when the air pressure is sufficient to operate satisfactorily the clamps 60 so that the workpiece W is secured to the table and a good electrical contact established therebetween before the contact $s12$ closes. The contact $s12$ thereby acts as an interlock insuring satisfactory electrical contact between the table 13 and the workpiece W before the contact closes to energize the solenoid L2 from the power source terminals $d$ and $c$ by means of a circuit also including the normally open contacts of the palm operated safety switches $s7$ and $s8$.

Energization of the solenoid L2 operates a control valve V4 whereby air supplied through the foot operated valve V3 is introduced into the conduit $p9$ which is also connected to the bellows B2 and B3 and a cylinder enclosing a piston 71. As the air pressure increases in the conduit $p9$ upon the opening of valve V4 the following steps take place successively, (1) the contacts $s9$ are opened by the extension of the bellows B2 thus preventing the energizing of the solenoid L1 during the welding cycle; (2) the switch $s1$ in the cable $w1$ is closed by the piston 71 against the biasing force of a spring 72; (3) the bellows B3 is extended to close the normally open contact $s11$, thereby energizing the solenoids operating the valves V1 and V2 from the power source terminals $d$ and $c$ through a circuit including the conductors $w7$ and $w8$ and the manually operated disconnect switches $s13$ and $s15$. The resulting opening of the valves V1 and V2 supplies operating air to the welding guns 10 and 10' whereby the studs $w$ are moved into contact with the workpiece W to complete the circuit discharging the capacitors C1—C10.

The number of capacitors connected in the welding circuit of each gun and the resistance introduced in such circuits by the resistors R1 and R2 is determined experimentally so that complete fusion of the welds is obtained without excessive burning of the studs. The resistors R1 and R2 also compensate for the difference in contact resistance in the various switches and junctions in the respective welding circuits.

After the set-up is complete, the operation for production welding is simple. The operator places the workpiece W upon the table 13 or if the piece is irregular in shape to a metal fixture fastened to the top of the table. A tipped stud of the type illustrated in my copending application Serial No. 43,498 is placed in the jaws of the respective chucks. The operator then steps upon the foot operated valve V3 and places his hands upon the safety switches $s7$ and $s8$. Opening of the valve V3 admits air through the conduits $p6$, $p7$ and $p8$ to the chucks 23 and 23' thus securing the studs $w$ therein as described heretofore. Air is simultaneously admitted to the cylinders 61 of the clamps 60. The pistons 62 are moved upwardly by the air in the cylinders 61 so that fingers at the end of the levers 63 force the workpiece W against the table 13 thus insuring a low resistance electrical contact therebetween. The operation of the safety switches $s7$ and $s8$ opens the normally closed contacts thereof to interrupt the circuit energizing the solenoid L1 opening the contacts $s5$ and $s6$ so that the power source terminals $d$ and $c$ are not short circuited through the low resistance of the welding circuits. The opening of the valve V3 also extends the bellows B1 so that the contact $s12$ energizes the solenoid L2, thus operating the control valve V4.

Air admitted through the valve V4 increases the pressure in the conduit $p9$ until the bellows B2 extends to open the contacts s9 thus insuring that the accidental closing of the normally closed contacts of the safety switches s7 and s8 will not energize the solenoid L2 during the welding cycle if the operator should accidentally remove either of his hands from the respective switches. A further increase in air pressure exerts sufficient pneumatic force upon the piston 71 to overcome the force exerted by the restoring spring 72 thereby closing the switch s1. The bellows B3 then extends to close the normally open contact s11 and energize the solenoids operating the valves V1 and V2 so that the guns 10 and 10' move the studs w into contact with the workpiece W as described heretofore.

After the discharge of the capacitors C1—C10 to complete the weld, the operator removes his foot to close the valve V3 thereby releasing the studs w from the chucks 23 and 23'. The reduction in pressure causes the bellows B1 to collapse opening the contact s12 thus moving the valve V4 so that the conduit p9 is vented to atmosphere. The bellows B3 collapses upon the reduction of pressure in conduit p9 thereby opening the contact s11 to de-energize the solenoids of the valves V1 and V2 so that the restoring air returns the chucks 23 and 23' to the retracted position. The contacts s9 close only after the pressure in the conduit p9 is below that pressure at which the switch s1 opens so that the welding circuit is opened to prevent the short circuiting of the power source terminals d and c in the event either of the guns 10 or 10' fails to retract.

It should be understood that the present disclosure is for the purpose of illustration only and that this invention includes all modifications and equivalents which fall within the scope of the appended claims.

I claim:

1. A welding system for percussion welding a stud to a workpiece comprising a compressed air supply, a pneumatically operated welding gun connected to said air supply including a cylinder having a piston reciprocatingly disposed therein and a pneumatically operated chuck carried by said piston and adapted to hold said stud, an electric power source connected between said gun and said workpiece, sequence controlling means for admitting air to said chuck and subsequently to said cylinder to move said piston until said stud contacts said workpiece to maintain a welding circuit supplying energy to the point of contact and to maintain said stud in forceable contact with said workpiece until the welding is complete, and pneumatically operated restoring means for returning said piston after the sequence controlling means shuts off the operating air supplied to said cylinder and said chuck upon the completion of the weld.

2. A welding system for percussion welding a stud to a workpiece comprising a compressed air supply, a pneumatically operated welding gun connected to said air supply including a cylinder having a piston reciprocatingly disposed therein and a chuck carried by said piston and adapted to hold said stud, an electric power source having two output terminals, one terminal being connected to said gun, a pneumatically operated switch connecting the other power source terminal to said workpiece, means for admitting air to said cylinder subsequent to the closing of said switch to move said piston until said stud contacts said workpiece to maintain a welding circuit supplying energy to the point of contact and to maintain said stud in forceable contact with said workpiece until the welding is complete, and restoring means for returning said piston and concomitantly disconnecting said power source after the completion of the weld and prior to the opening of said switch.

3. A welding system for percussion welding a stud to a workpiece comprising a compressed air supply, a pneumatically operated welding gun including a cylinder having a piston reciprocatingly disposed therein and a chuck carried by said piston and adapted to hold said stud, a solenoid operated valve connecting said cylinder to said air supply, an electric power source having two output terminals, one of which is connected to said gun, a pneumatically operated switch connecting the other power source terminal to said workpiece, a manually operated valve for connecting the air source to said pneumatically operated switch, a pneumatically operated contact for energizing the solenoid of said valve from said power source when the air pressure is greater than that required to close said switch whereby admission of air to said cylinder by the opening of the solenoid operated valve subsequent to the closing of said switch moves said piston so that said stud contacts said workpiece to maintain a welding circuit supplying energy to the point of contact to maintain said stud in forceable contact with said workpiece until the welding is complete, and restoring means for returning said piston and concomitantly disconnecting said source after the completion of the weld.

4. A welding system for percussion welding a stud to a workpiece comprising a compressed air supply, a pneumatically operated welding gun including a cylinder having a piston reciprocatingly disposed therein and a chuck carried by said piston and adapted to hold said stud, a solenoid operated valve connecting said cylinder to said air supply, an electric power source having two output terminals, one terminal being connected to said gun, a pneumatically operated switch connecting the other power source terminal to said workpiece, a foot operated valve for connecting the air source to said pneumatically operated switch, two hand operated safety switches connected in series with the valve solenoid, and a pneumatically operated contact for energizing the solenoid of said valve from said power source by completing a circuit also including said hand switches when the air pressure is greater than that required to close said pneumatically operated switch whereby admission of air to said cylinder by the opening of the solenoid operated valve subsequent to the closing of said pneumatically operated switch moves said piston so that said stud contacts said workpiece to maintain a welding circuit supplying energy to the point of contact to maintain said stud in forceable contact with said workpiece until the welding is complete, and restoring means for returning said piston and concomitantly disconnecting said source after the completion of the weld.

5. A welding system for percussion welding a stud to a workpiece comprising a compressed air supply, a pneumatically operated welding gun including a cylinder having a piston reciprocatingly disposed therein and a chuck carried by said piston and adapted to hold said stud, a solenoid operated valve connecting said cylinder to said air supply, a capacitor having two output terminals connected to its respective plates, one terminal being connected to said gun, a pneumatically operated switch connecting the other capacitor terminal to said workpiece, a power source for charging said capacitor, a relay having a contact connecting the power source to the capacitor and a solenoid, two hand operated switches each having a normally closed contact connected in series with said solenoid and said power source to complete a charging circuit and a normally open contact connected in series with the normally open contact of the other switch, a foot operated valve for connecting the air source to said pneumatically operated switch, and a pneumatically operated contact for energizing the solenoid of said valve from said power source by completing a circuit also including the normally open contacts of the hand operated switches when the air pressure is greater than that required to close said pneumatically operated switch whereby admission of air to said cylinder by the opening of the solenoid operated valve subsequent to the closing of said pneumatically operated switch moves said piston so that said stud contacts said workpiece to maintain a welding circuit supplying energy to the point of contact to maintain said stud in forceable contact with said workpiece until the welding is complete, and restoring means for returning said piston and concomitantly disconnecting said source after the completion of the weld.

6. A welding system for percussion welding a stud to a workpiece held on a work table by air operated clamps comprising a compressed air supply, a pneumatically operated welding gun including a cylinder having a piston reciprocatingly disposed therein, one end of said cylinder being directly connected to the air supply so that the piston is continuously subjected to a restoring force, and a pneumatically operated chuck carried by said piston and adapted to hold said stud, a power source, two hand operated switches each having a normally open contact connected in series with the normally open contact of the other switch and a normally closed contact connected in series with the normally closed contact of the other switch, a pneumatically operated interlock having a normally open contact closed by air pressure in excess of that pressure required to operate the clamps, a control valve having an operating solenoid connected in series with the power source, the normally open contacts of the hand switches and the contact of the pneumatic interlock, a foot operated valve concomitantly supplying air to the clamps, the chuck, the interlock and the control valve, an electrically operated supply valve connecting the cylinder to said air supply to operate said gun, the end of the piston in contact with the operating air having a greater effective area than the opposite piston end in contact with the restoring air, the resulting unbalanced force moving said piston until said stud contacts said workpiece, a capacitor having two output terminals connected to its respective plates, one terminal being connected to the chuck of the gun, a pneumatically operated switch connecting the other capacitor terminal to said workpiece, an electric relay having a solenoid and normally open contacts operated thereby to connect the capacitors to the power source to complete a charging circuit, a pneumatically operated relay having a normally open contact closed by air pressure in excess of that pressure required for operation of the pneumatically operated switch to energize the supply valve from said power source and a normally closed contact, and a second pneumatically operated relay having a normally closed contact opened by air pressure less than the pressure required for operation of the pneumatically operated switch to complete a circuit for energizing the electric relay solenoid from the power source by means of a series circuit also including the normally closed contacts of the hand switches and the normally closed contact of the second pneumatically operated switch, said pneumatically operated relays and switch being connected to said air supply by said control valve upon the opening of said foot operated valve whereby the admission of air to said cylinder by the opening of the electrically operated valve subsequent to the closing of said pneumatically operated switch moves said piston so that said stud contacts said workpiece to maintain a welding circuit supplying energy to the point of contact to maintain said stud in forceable contact with said workpiece until welding is complete, whereupon the force exerted by the restoring air returns the piston to its original position upon the subsequent closing of the foot operated valve.

7. A welding gun for percussion welding a stud to a workpiece comprising a cylinder having a supporting flange, a piston reciprocatingly disposed in the cylinder, a piston rod having one end fastened to said piston, a chuck for holding the stud fastened to the other end of the rod, said chuck being adapted to be connected to one terminal of a power source the other terminal of which is connected to the workpiece, a sleeve closing one end of the cylinder and having an aperture therethrough for guiding the rod, a cap closing the opposite end of the cylinder and including passage means for admitting air to one end of said cylinder to move said piston until said stud contacts said workpiece to maintain a welding circuit supplying energy to the point of contact and to maintain said stud in forceable contact with said workpiece until welding is complete, and restoring means including a passageway extending through the flange to introduce air into the cylinder upon the opposed side of the piston from the air admitted through the passageway in the cap for returning said piston.

8. A welding gun for percussion welding a stud to a workpiece comprising a supporting frame, a cylinder supported by said frame and having a piston reciprocatingly disposed therein, an insulating gasket interposed between said frame and said cylinder thereby electrically to isolate said frame from said cylinder, a piston rod having one end fastened to said piston, a head having a circular recess therein fastened to the other end of the rod, said gun being adapted to be connected to one terminal of a power source the other terminal of which is connected to the workpiece, a chuck body having a plurality of jaws at one end thereof the inner surfaces of which define a centrically disposed recess for holding the stud, the outer surfaces of the jaws being tapered, the other end of the body being fastened to said head with its axis aligned with the axis of the head recess, a collet positioned circumjacent said body and having a tapered inner surface corresponding to the tapered outer jaw surfaces at one end thereof, a flange projecting normally at the other end of the collet and located in said head recess, a sealing member disposed between said flange and the bottom of said head recess, means for introducing air behind said member for moving said collet with respect to said body to reduce the diameter of the body recess to secure the stud, and means for admitting air to said cylinder to move said piston until said stud contacts said workpiece to maintain a welding circuit supplying energy to the point of contact and to maintain said stud in forceable contact with said workpiece until welding is complete, and restoring means for returning said piston.

9. A welding gun for percussion welding a stud to a workpiece comprising a supporting frame, a cylinder having a piston reciprocatingly disposed therein, an insulating gasket interposed between said cylinder and said frame thereby electrically to isolate said cylinder from said frame, one end of said cylinder being connected by means of said gasket with an air supply so that said piston is continuously subjected to a restoring force, a piston rod having one end fastened to said piston, a sleeve interposed between said cylinder and said rod to act as a guide therefor, a head having a circular recess therein fastened to the other end of the rod, a chuck having a plurality of jaws at one end thereof the inner surfaces of which define a centrically disposed recess for holding the stud, the outer surfaces of the jaws being tapered, the other end of the body being fastened to said head with its axis aligned with the axis of the circular recess in the head, a collet positioned circumjacent said body and having a tapered inner surface corresponding to the tapered outer jaw surfaces at one end thereof, a flange projecting normally at the other end of the collet and located in said head recess, a sealing washer having one side abutting the inner side of said flange with its inner diameter bearing against said body and its outer diameter bearing against the wall of the circular recess, said head having connecting means adapted to secure a cable from an electric power source the other terminal of which is connected to the workpiece and a passageway therein connecting with the circular recess and adapted to be connected to a compressed air supply, and means for admitting air to said cylinder to move said piston until said stud contacts said workpiece to maintain a welding circuit supplying energy to the point of contact and to maintain said stud in forceable contact with said workpiece until welding is complete, said piston being returned by the restoring air.

10. A welding gun for percussion welding a stud to a workpiece comprising a cylinder having a supporting flange, a piston of insulating material reciprocatingly disposed in the cylinder, a chuck adapted to hold said stud, a piston rod carrying said chuck and said piston on the respective ends thereof, a sleeve of insulating material interposed between one end of said cylinder and said rod to act as a guide therefor, said chuck being adapted to be connected to one terminal of a power source the other terminal of which is connected to the workpiece, a cap closing the opposite end of the cylinder and including passage means for admitting air to said cylinder to move said piston until said stud contacts said workpiece to maintain a welding circuit supplying energy to the point of contact and to maintain said stud in forceable contact with said workpiece until welding is complete, and restoring means including a passageway extending through the flange to introduce air into the cylinder upon the opposed side of the piston from the air admitted through the passageway in the cap for returning said piston.

HAROLD J. GRAHAM.

REFERENCES CITED

The following references are of record in the file of this patent:

UNITED STATES PATENTS

| Number | Name | Date |
|---|---|---|
| 728,572 | Hanson | May 19, 1903 |
| 1,085,146 | McClellan | Jan. 27, 1914 |
| 1,523,666 | Steele et al. | Jan. 20, 1925 |
| 2,037,040 | Paugh | Apr. 14, 1936 |
| 2,082,904 | Podauy | June 8, 1937 |
| 2,331,537 | Clark | Oct. 12, 1943 |
| 2,340,694 | Rogers | Feb. 1, 1944 |
| 2,465,456 | Johnson | Mar. 29, 1949 |